April 15, 1958 — L. E. GRIFFITH — 2,830,487
AUTOMATIC RANGE FINDING DEVICE
Filed May 31, 1955

INVENTOR.
LOUIS E. GRIFFITH
BY
ATTYS.

2,830,487

AUTOMATIC RANGE FINDING DEVICE

Louis E. Griffith, Indianapolis, Ind., assignor to the United States of America as represented by the Secretary of the Navy Application May 31, 1955, Serial No. 512,351

7 Claims. (Cl. 88—1)

(Granted under Title 35, U. S. Code (1952), sec. 266)

The invention described herein may be manufactured and used by or for the Government of the United States of America for governmental purposes without the payment of any royalties thereon or therefor.

The present invention relates to range finding devices and more particularly to passive range finding devices that determine range automatically.

Range finding devices are classed broadly as either active or passive. An active system of range finding, of which radar is a good example, broadcasts or transmits information to a target which reflects or returns the signal to a receiver. From the rate and time of travel, the distance to a target can readily be determined.

A passive range finding device does not employ transmitting means in determining range, but only receives information emitting from a target. Heretofore passive range finding devices have been optical instruments of either stereoscopic or coincidence type. In either of these types of range finding devices, an operator adjusts a measuring wedge which deviates the light from one of two viewing windows to be parallel with the light from the other viewing window. The manner in which this parallelism is perceived by the operator is essentially the only difference between the stereoscopic and coincidence type range finders.

Heretofore available optical range finding instruments have had several inherent disadvantages in that a trained operator is constantly required to monitor the instrument and also if sufficient accuracy beyond one thousand yards range is desired it is necessary to have base lines, that is, distance between the viewing windows, of several yards.

The present invention described herein, although classed as a passive type range finder, differs greatly from heretofore known range finders in that range is measured as a function of time and frequency, both of which can be determined to a high degree of accuracy. Two electro-optical receivers are spaced apart a fixed distance and are rotated at a uniform rate of rotation. The fields of view of these electro-optical receivers will sweep a given target at slightly different times since they are spaced apart a fixed distance. A measure of this time interval, along with the angular rate of rotation and the distance between receivers, can be utilized to compute the distance to a target. It is therefore a general object of the present invention to provide novel ranging means that can determine the distance to a target accurately and automatically.

Other objects and many of the attendant advantages of this invention will be readily appreciated as the same becomes better understood by reference to the following detailed description when considered in connection with the acompanying drawing wherein.

Figure 1:
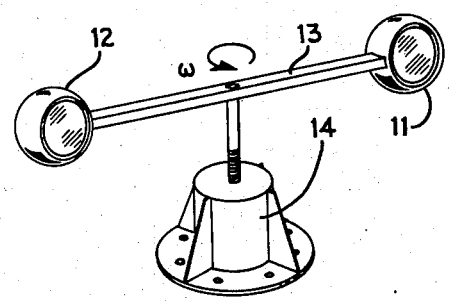
Figure 1 is a perspective view showing a pair of electro-optical receivers mounted on a rotatable arm.

Referring now to the drawing, wherein like reference characters designate like or corresponding parts throughout the several views, there is shown in Figure 1 an embodiment of the invention wherein two electro-optical receivers 11 and 12 are attached to a rotary arm 13 which is driven at a constant angular speed by a motor 14.

Figure 5:
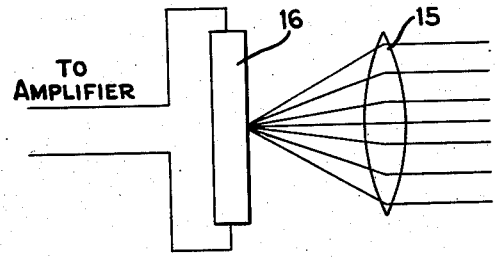
Figure 5 is a view showing a lens and photo-conductive detector of an electro-optical receiver.

The electro-optical receivers 11 and 12 might be one of several well known types, one of which is illustrated in Figure 5 of the drawing wherein a lens 15 focuses the radiant energy emitting from a target on a photo-conductive detector 16. By way of example, the photo-conductive detector 16 might be of the lead sulfide type (PbS) which consists of the deposition of PbS between two electrodes. The energy, which is focused on the photo-conductive detector 16 by the lens 15 causes a change in resistance to take place and for a given potential, a change in resistance causes a change of current flow.

Figure 2:
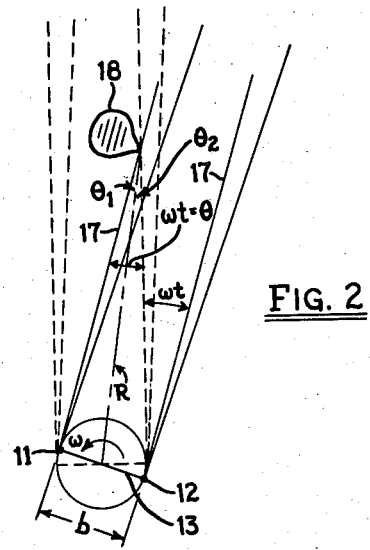
Figure 2 is a diagrammatic view showing the mathematical relationship of the electro-optical receiver of Figure 1.

As shown in Figure 2 of the drawing the electro-optical receivers 11 and 12 are rigidly mounted to the rotary arm 13 such that the leading edges 17 of the fields of view of the two receivers are parallel to each other and perpendicular to the rotary arm 13. The motor 14 rotates the rotary arm 13 at a constant angular rate $\omega$ and measurement of the time elapsed between the sweeping of a target 18 by receiver 11 and by that of receiver 12 provides a convenient method for measuring range.

Figure 6:
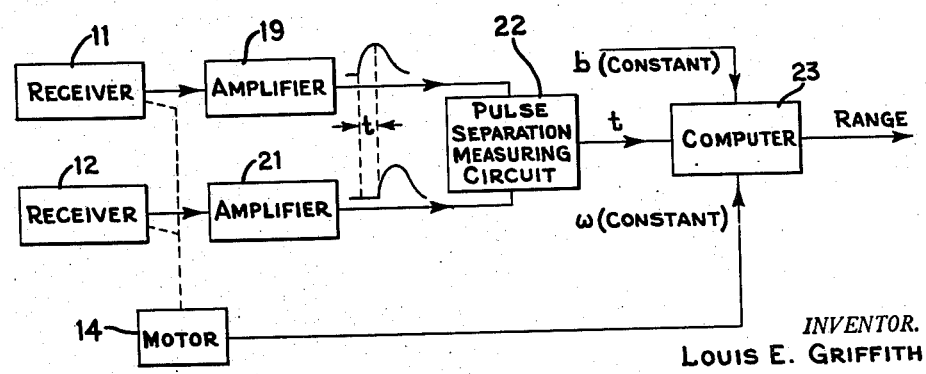
Figure 6 is a diagramamtic view of a system employed to compute range.

From Figure 2 of the drawing, wherein $b$ is the distance between receivers 11 and 12 and R is range to the target 18, it can be seen that:

Equation (1) $\qquad \sin \theta_1 = \dfrac{b/2}{R}$ and (2) $\qquad \sin \theta_2 = \dfrac{b/2}{R}$ therefore (3) $\qquad \theta_1 = \theta_2 = \dfrac{\theta}{2}$ and (4) $\qquad \sin \dfrac{\theta}{2} = \dfrac{b/2}{R}$ therefore (5) $\qquad R = \dfrac{b/2}{\sin \theta/2}$ and since (6) $\qquad \theta = \omega(t_2 - t_1) = \omega t$ therefore (7) $\qquad R = \dfrac{b}{2 \sin \dfrac{\omega t}{2}}$ and where $R \gg b$ (8) $\qquad R \doteq \dfrac{b}{\omega t}$ In Equation 8 above, since $b$ is a constant, and $\omega$ is a constant angular rate, it is only necessary to measure $t$ to determine range, and in Figure 6 of the drawing an automatic system for computing range is illustrated. The separate pulses, which are generated in the receivers 11 and 12 are amplified by amplifiers 19 and 21, respectively and then fed into a pulse separation measuring circuit 22 which measures the time interval $t$ and whose output is fed into the computer 23. The value for $b$ and $\omega$, since both are constants, can be fed into the computer directly and the computer 23 can then compute the range value. The computer 23 might be one of many well known types available and might either be of the electrical or mechanical type as only simple multiplication and division is required as indicated in Equation 8.

Figure 3:
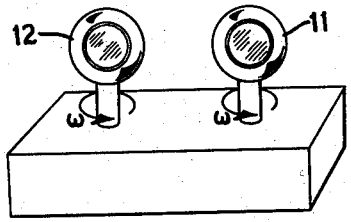
Figure 3 is a perspective view showing a pair of electro-optical receivers individually rotatable.

In Figure 3 of the drawing there is shown another embodiment of the invention wherein a pair of electro-optical receivers 11 and 12 are individually rotatable. The receivers are driven in synchronism.

Figure 4:
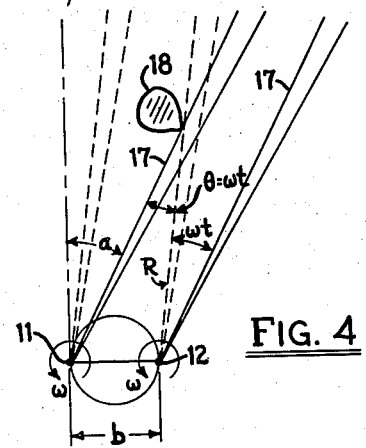
Figure 4 is a diagrammatic view showing the mathematical relationship of the electro-optical receivers of Figure 3.

From Figure 4 of the drawing, wherein $b$ is the distance between receivers 11 and 12, R is the range, and "$a$" is the angle made by a line to the target and a perpendicular to the base line, it can be seen that:

From the law of sines,

Equation (9) $$\frac{R}{\sin(90-"a")} = \frac{b}{\sin \theta}$$

and also

(10) $$R = \frac{b \cos "a"}{\sin \theta}$$

and since $\theta = \omega t$, whenever $R \gg b$

(11) $$R \doteq \frac{b \cos "a"}{\omega t}$$

The angle "$a$" can be readily determined by using a reference signal and measuring the period of time elapsed between the target pulse from one receiver and the reference signal.

In some applications it is possible to adjust the base line position in such a manner that the angle "$a$" is reduced to zero. This could be accomplished by having the base line seek a position so that the time elapsed between the signal pulse and a reference pulse is zero. In such a case, the expression for range is the same as that for the rotating base line shown in Figure 2, that is:

$$R \doteq \frac{b}{\omega t}$$

In operation, the electro-optical receivers 11 and 12 are rotated at a constant angular rate and since the receivers are displaced a distance of $b$, the receivers will sweep a given target at slightly different times. Radiant energy, which might be either in the visible or the infrared frequency range, is emitted by the target and received in the electro-optical receivers, where it is focused onto a photo-conductive detector. The detectors generate pulses whenever a target is perceived, and the time difference in pulses is measured and used to compute range, the range being directly proportional to time difference.

Obviously many modifications and variations of the present invention are possible in the light of the above teaching. It is therefore to be understood that the invention may be practiced otherwise than as specifically described.

What is claimed is:

1. A device for determining the range of a distant object comprising, first and second laterally displaced radiant energy sensitive receivers having a field of view adaptable for producing pulses from energy emitting from a distant object, means for rotating said receivers at a constant angular velocity, and means for indicating time interval between separate pulses generated by different receivers.

2. A device for determining the range of a distant object as set forth in claim 1 wherein said means for rotating said receivers includes a rotary arm adaptable for attaching said first and second receivers thereon, and means for rotating said rotary arm.

3. A device for determining the range of a distant object as set forth in claim 1 wherein said means for rotating said receivers includes separate rotary means for each said receiver.

4. A device for determining the range of a distant object as set forth in claim 1 wherein said radiant energy sensitive receivers include a photo-conductive detector and means for focusing said energy emitting from a distant object on said photo-conductive detector.

5. A system for determining the range of a distant object comprising, first and second laterally displaced radiant energy sensitive receivers having a field of view adaptable for producing pulses from energy emitting from a distant object, means for rotating said receivers at a constant angular velocity, amplifying means in circuit with each said receivers, pulse separation measuring means in circuit with said amplifiers, and computing means connected to said pulse separation measuring means.

6. A system for determining the range of a distant object as set forth in claim 5 wherein said means for rotating said receivers includes a rotary arm adaptable for attaching said first and second receivers thereon, and means for rotating said rotary arm.

7. A system for determining the range of a distant object as set forth in claim 5 wherein said means for rotating said receivers includes separate rotary means for each said receiver.

References Cited in the file of this patent

UNITED STATES PATENTS

| | | |
|---|---|---|
| 2,166,991 | Guanella | July 25, 1939 |
| 2,392,873 | Zahl | Jan. 15, 1946 |
| 2,444,235 | Walker | June 29, 1948 |
| 2,644,158 | Thrift | June 30, 1953 |